(12) United States Patent
Uda

(10) Patent No.: US 11,496,916 B2
(45) Date of Patent: Nov. 8, 2022

(54) MEASUREMENT APPARATUS AND MEASUREMENT TARGET DISPLAY METHOD THEREOF

(71) Applicant: ANRITSU CORPORATION, Kanagawa (JP)

(72) Inventor: Yasuko Uda, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/940,756

(22) Filed: Jul. 28, 2020

(65) Prior Publication Data

US 2021/0037402 A1 Feb. 4, 2021

(30) Foreign Application Priority Data

Jul. 29, 2019 (JP) .............................. JP2019-139028

(51) Int. Cl.
| | |
|---|---|
| H04W 24/08 | (2009.01) |
| G06F 3/04817 | (2022.01) |
| G06F 3/0482 | (2013.01) |
| H04L 5/00 | (2006.01) |
| H04W 84/12 | (2009.01) |

(52) U.S. Cl.
CPC .......... *H04W 24/08* (2013.01); *G06F 3/0482* (2013.01); *G06F 3/04817* (2013.01); *H04L 5/001* (2013.01); *H04W 84/12* (2013.01)

(58) Field of Classification Search
CPC ... H04W 24/08; H04W 84/12; G06F 3/04817; G06F 3/0482; H04L 5/001
See application file for complete search history.

(56) References Cited

U.S. PATENT DOCUMENTS

| | | | |
|---|---|---|---|
| 7,459,898 B1 * | 12/2008 | Woodings | G01R 23/16 324/76.19 |
| 2011/0022450 A1 * | 1/2011 | Meredith | G06Q 30/0241 705/14.4 |

FOREIGN PATENT DOCUMENTS

JP        2018-164214 A    10/2018

* cited by examiner

*Primary Examiner* — Nha Huy T Nguyen
(74) *Attorney, Agent, or Firm* — Pearne & Gordon LLP

(57) ABSTRACT

There is provided a measurement apparatus capable of easily and definitely designating a desired measurement target when measuring communication in IEEE 802.11ax. There is provided a control unit that selectably displays a plurality of resource unit display graphic forms which are graphic forms illustrating resource units arranged in a frequency bandwidth of a channel on a display unit, selects a resource unit which is the measurement target by selecting at least one resource unit display graphic form of the plurality of resource unit display graphic forms, and varies a display of the resource unit display graphic form between an unselected state, a selected state, and a state before selection different from each other, in a case where communication in accordance with a standard of IEEE 802.11ax is measured.

17 Claims, 5 Drawing Sheets

MEASUREMENT APPARATUS AND MEASUREMENT TARGET DISPLAY METHOD THEREOF

TECHNICAL FIELD

The present invention relates to a measurement apparatus, and more particularly, to a measurement apparatus which measures a device under test (DUT) which operates in accordance with a communication standard of a wireless local area network (LAN).

BACKGROUND ART

Various wireless communication technologies are developed along with development of information communication technologies. Among these, as a communication standard related to a wireless LAN technology, for example, institute of electrical and electronics engineers (IEEE) 802.11n or IEEE 802.11ac is known.

Patent Document 1 describes a measurement apparatus which performs wireless LAN communication with a device under test (DUT) which performs wireless LAN communication and measures a packet error rate, throughput, or the like in the wireless LAN communication.

RELATED ART DOCUMENT

Patent Document

[Patent Document 1] JP-A-2018-164214

DISCLOSURE OF THE INVENTION

Problem that the Invention is to Solve

In recent years, as a next version of IEEE 802.11ac, IEEE 802.11ax, which is a high efficiency (HE) wireless LAN standard, has been proposed.

In IEEE 802.11ax, orthogonal frequency division multiple access (OFDMA) is adopted so that more users can use the same frequency bandwidth.

In orthogonal frequency division multiplexing (OFDM) adopted in IEEE 802.11a/g/n/ac, one user uses all frequency bands of channels having a predetermined frequency bandwidth used for communication.

In OFDMA of IEEE 802.11ax, a frequency band of a channel is divided into sub-channels, each sub-channel is allocated to each user, and the frequency band of the channel can be used by a plurality of users.

In a case where communication in such IEEE 802.11ax is measured, it is necessary to specify the sub-channel, but there is no method of designating the sub-channel to be measured.

Therefore, an object of the present invention is to provide a measurement apparatus capable of easily and definitely designating a desired measurement target when measuring communication in IEEE 802.11ax.

Means for Solving the Problem

According to a first aspect of the present invention, there is provided a measurement apparatus which transmits and receives a wireless signal to and from a device under test (DUT) and measures a transmission and reception characteristic of the DUT, the apparatus including: a display unit; and a control unit that selectably displays a plurality of resource unit display graphic forms which are graphic forms illustrating resource units arranged in a frequency bandwidth of a channel on the display unit, selects a resource unit which is a measurement target by selecting at least one of the plurality of resource unit display graphic forms, and varies a display of the resource unit display graphic form between an unselected state, a selected state, and a state before selection which are different from each other, in a case where communication in accordance with a standard of IEEE 802.11ax is measured.

With this configuration, in a case where communication in accordance with the standard of IEEE 802.11ax is measured, the plurality of resource unit display graphic forms which are graphic forms illustrating resource units arranged in a frequency bandwidth of a channel are selectably displayed on the display unit, and the resource unit display graphic form is displayed in different states between the unselected state, the selected state, and the state before selection. Therefore, it is possible to easily confirm a position of the selected resource unit or the resource unit to be selected, and it is possible to easily and definitely designate the desired measurement target.

In addition, according to a second aspect of the present invention, in the measurement apparatus of the first aspect, the control unit further displays a number of the selected resource unit as an RU number display and selection unit.

With this configuration, the number of the selected resource unit is displayed in the RU number display and selection unit. Therefore, the position of the resource unit can be easily confirmed by the number of the selected resource unit, and the desired measurement target can be easily and definitely designated.

In addition, according to a third aspect of the present invention, in the measurement apparatus of the first aspect, the control unit further displays an RU number display and selection unit capable of selecting a desired resource unit by inputting a number of the desired resource unit, and sets a display of the resource unit display graphic form selected by the RU number display and selection unit as being selected.

With this configuration, it is possible to easily designate the desired measurement target based on the number of the desired resource unit, and it is further possible to confirm a designation result by a display state of the resource unit graphic form.

In addition, according to a fourth aspect of the present invention, in the measurement apparatus of the first aspect, the control unit displays the resource unit display graphic form in a size corresponding to a frequency bandwidth of a corresponding resource unit. According to a fifth aspect of the present invention, in the measurement apparatus of the second aspect, the control unit displays the resource unit display graphic form in a size corresponding to a frequency bandwidth of a corresponding resource unit. According to a sixth aspect of the present invention, in the measurement apparatus of the third aspect, the control unit displays the resource unit display graphic form in a size corresponding to a frequency bandwidth of a corresponding resource unit.

With this configuration, the resource unit display graphic form is displayed in a size corresponding to the frequency bandwidth of the corresponding resource unit. Therefore, it is possible to easily confirm the frequency bandwidth of the selected resource unit or the resource unit to be selected, and it is possible to easily and definitely designate the desired measurement target.

In addition, according to a seventh aspect of the present invention, in the measurement apparatus of the first aspect, the control unit displays the resource unit display graphic form in a size corresponding to a frequency bandwidth of a corresponding resource unit, and displays a plurality of the resource unit display graphic forms having the same size side by side in a horizontal direction representing a frequency band. According to an eighth aspect of the present invention, in the measurement apparatus of the second aspect, the control unit displays the resource unit display graphic form in a size corresponding to a frequency bandwidth of a corresponding resource unit, and displays a plurality of the resource unit display graphic forms having the same size side by side in a horizontal direction representing a frequency band. According to a ninth aspect of the present invention, in the measurement apparatus of the third aspect, the control unit displays the resource unit display graphic form in a size corresponding to a frequency bandwidth of a corresponding resource unit, and displays a plurality of the resource unit display graphic forms having the same size side by side in a horizontal direction representing a frequency band.

With this configuration, the resource unit display graphic forms having the same frequency bandwidth are displayed side by side in a size corresponding to the frequency bandwidth of the corresponding resource unit. Therefore, it is possible to easily confirm the frequency bandwidth of the selected resource unit or the resource unit to be selected, and it is possible to easily and definitely designate the desired measurement target.

According to a tenth aspect of the present invention, there is provided a measurement target display method of a measurement apparatus which includes a display unit and measures a transmission and reception characteristic of a device under test (DUT) by transmitting and receiving a wireless signal to and from the DUT, the method including: in a case where communication in accordance with a standard of IEEE 802.11ax is measured, a step of selectably displaying a plurality of resource unit display graphic forms which are graphic forms illustrating resource units arranged in a frequency bandwidth of a channel, on the display unit; a step of selecting a resource unit which is a measurement target by selecting at least one of the plurality of resource unit display graphic forms; and a step of varying a display of the resource unit display graphic form between an unselected state, a selected state, and a state before selection which are different from each other.

With this configuration, in a case where communication in accordance with the standard of IEEE 802.11ax is measured, the plurality of resource unit display graphic forms which are graphic forms illustrating resource units arranged in a frequency bandwidth of a channel are selectably displayed on the display unit, and the resource unit display graphic form is displayed in different states between the unselected state, the selected state, and the state before selection. Therefore, it is possible to easily confirm a position of the selected resource unit or the resource unit to be selected, and it is possible to easily and definitely designate the desired measurement target.

According to an eleventh aspect of the present invention, there is provided a measurement target display method of a measurement apparatus which includes a display unit and measures a transmission and reception characteristic of a device under test (DUT) by transmitting and receiving a wireless signal to and from the DUT, the method including: in a case where communication in accordance with a standard of IEEE 802.11ax is measured, a step of selectably displaying a plurality of resource unit display graphic forms which are graphic forms illustrating resource units arranged in a frequency bandwidth of a channel, on the display unit; a step of selecting at least one of the plurality of resource unit display graphic forms by inputting a number of the resource unit to select a resource unit which is a measurement target; and a step of varying a display of the resource unit display graphic form between an unselected state, a selected state, and a state before selection which are different from each other.

With this configuration, it is possible to easily designate the measurement target based on the number of the resource unit input by an operator, and it is further possible to confirm a designation result by a display state of the resource unit graphic form.

Advantage of the Invention

The present invention can provide a measurement apparatus capable of easily and definitely designating a desired measurement target when measuring communication in IEEE 802.11ax.

BEST MODE FOR CARRYING OUT THE INVENTION

Hereinafter, a measurement apparatus according to an embodiment of the present invention will be described in detail with reference to the drawings.

Figure 1:
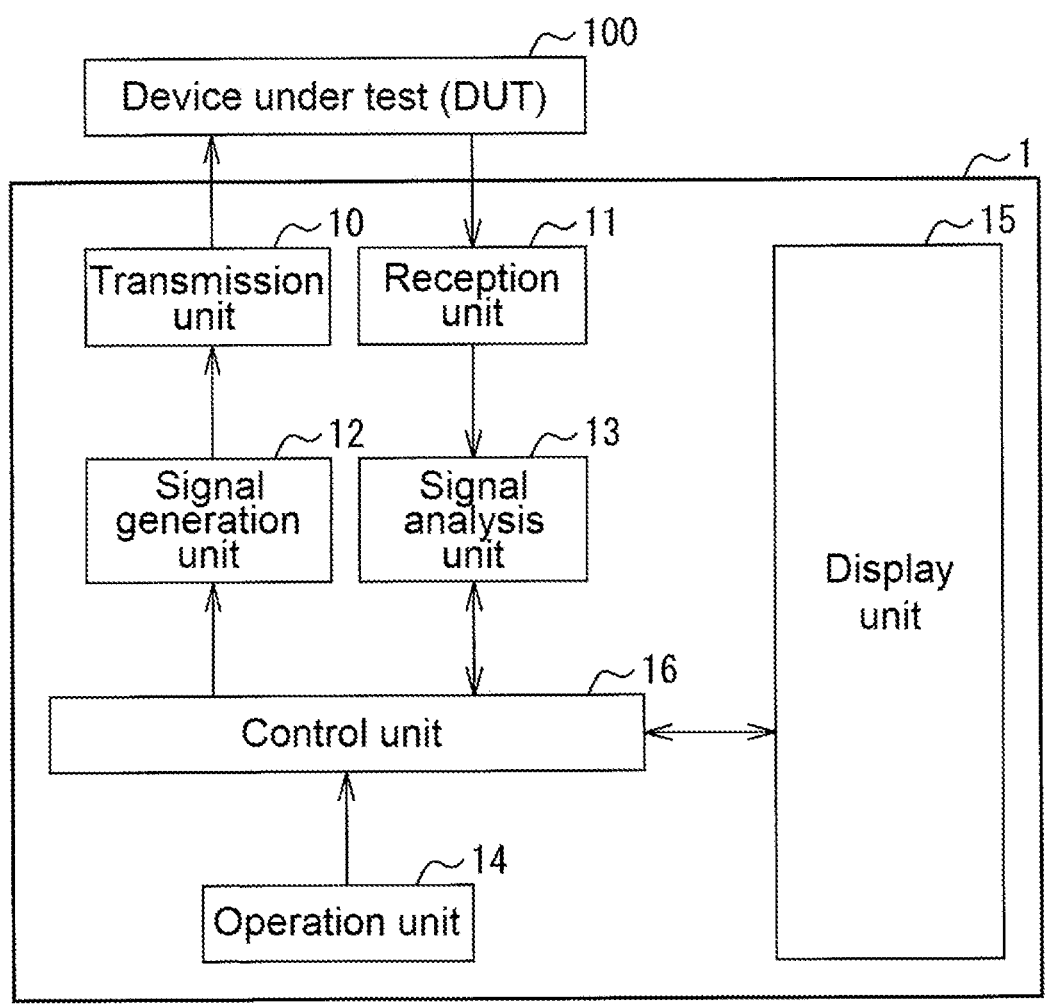
FIG. 1 is a block diagram of a measurement apparatus according to an embodiment of the present invention.

In FIG. 1, a measurement apparatus 1 according to the embodiment of the present invention wirelessly communicates with a device under test (DUT) 100 to perform various types of measurement on the device under test (DUT) 100. In the present embodiment, the measurement apparatus 1 operates as a wireless LAN master device (Access Point (AP)) and the device under test (DUT) 100 operates as a wireless LAN slave device (station (STA)), but the present embodiment is not limited to this, and the measurement apparatus 1 may operate as the STA and the device under test (DUT) 100 may operate as the AP. The measurement apparatus 1 communicates with the device under test (DUT) 100 in accordance with a communication standard based on IEEE 802.11.

The measurement apparatus 1 is configured to include a transmission unit 10, a reception unit 11, a signal generation unit 12, a signal analysis unit 13, an operation unit 14, a display unit 15, and a control unit 16.

The transmission unit 10 amplifies or frequency-converts a signal generated by the signal generation unit 12 and transmits the signal to the device under test (DUT) 100.

The reception unit 11 amplifies or frequency-converts a wireless signal received from the device under test (DUT) 100 and outputs the signal to the signal analysis unit 13.

The signal generation unit 12 generates a signal including a control packet or a data packet for communicating with the device under test (DUT) 100, and transmits the signal to the device under test (DUT) 100 via the transmission unit 10.

The signal analysis unit 13 analyzes the signal received from the device under test (DUT) 100 via the reception unit 11 and performs a process of measuring transmission and reception characteristics of the device under test (DUT) 100. The transmission and reception characteristics include a packet error rate, error vector magnitude (EVM), transmission power, and the like.

The operation unit 14 includes input devices such as a keyboard, a mouse, and a touch panel, and outputs information input by an operation to the control unit 16.

The display unit 15 is configured to include an image display device such as a liquid crystal display, and displays an image for inputting information necessary for measurement, an image indicating a measurement result, or the like.

The control unit 16 is configured to include computer units including a central processing unit (CPU), a random access memory (RAM), a read only memory (ROM), a hard disk device, and an input and output port (not illustrated).

The ROM and the hard disk device of this computer unit store various control constants, various maps, and the like, as well as a program for causing the computer unit to function as the control unit 16. That is, the computer unit functions as the control unit 16 by the CPU executing the program stored in the ROM and the hard disk device. The hard disk device may be a compact flash (CF) card by a flash memory.

The signal generation unit 12, the signal analysis unit 13, the operation unit 14, and the display unit 15 are connected to the input and output port of the control unit 16, and the control unit 16 and each unit can transmit and receive signals to and from each other.

The measurement apparatus 1 of the present embodiment can measure communication in accordance with a standard of IEEE 802.11ax.

In IEEE 802.11ax, a channel having a predetermined frequency bandwidth used for communication is divided into resource units (RU) consisting a predetermined number of subcarriers, and each is allocated to a user for each resource unit, and communication is performed.

The minimum number of subcarriers consisting the resource unit is 26 (26-tone RU), and there are further 52 (52-tone RU), 106 (106-tone RU), 242 (242-tone RU), 484 (484-tone RU), and the like. The frequency bandwidth of the channel includes 20 MHz, 40 MHz, 80 MHz, and the like.

Figure 2:
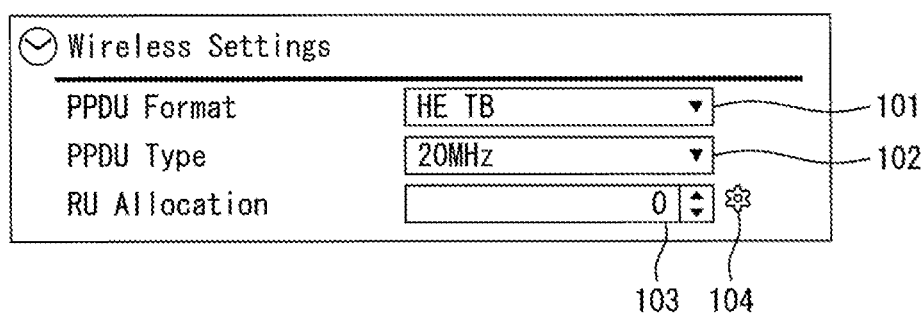
FIG. 2 is a diagram illustrating an example of a wireless communication setting image of the measurement apparatus according to the embodiment of the present invention.

The control unit 16 displays an image (a wireless setting image) as illustrated in FIG. 2 on the display unit 15 to perform a setting for wireless communication.

In FIG. 2, a PPDU format selection unit 101 selects a format of a physical layer convergence protocol (PLCP) protocol data unit (PPDU). A PPDU type selection unit 102 selects a frequency bandwidth of a channel. The frequency bandwidth of the channel can be selected among 20 MHz, 40 MHz, and 80 MHz, for example.

When "HE TB" is selected in the PPDU format selection unit 101, the control unit 16 displays an RU allocation setting unit 103 and an RU allocation selection icon 104.

The RU allocation setting unit 103 allocates an RU which is a measurement target with a numerical value to be described below. The RU allocation selection icon 104 allocates the RU which is the measurement target from a configuration image of the RU displayed on the display unit 15.

When the RU allocation selection icon 104 is selected by, for example, being clicked by the mouse of the operation unit 14, the control unit 16 displays an RU configuration image (a configuration image of an RU corresponding to the frequency bandwidth selected by the PPDU type selection unit 102) on the display unit 15 and the RU which is the measurement target is allocated.

Figure 3:
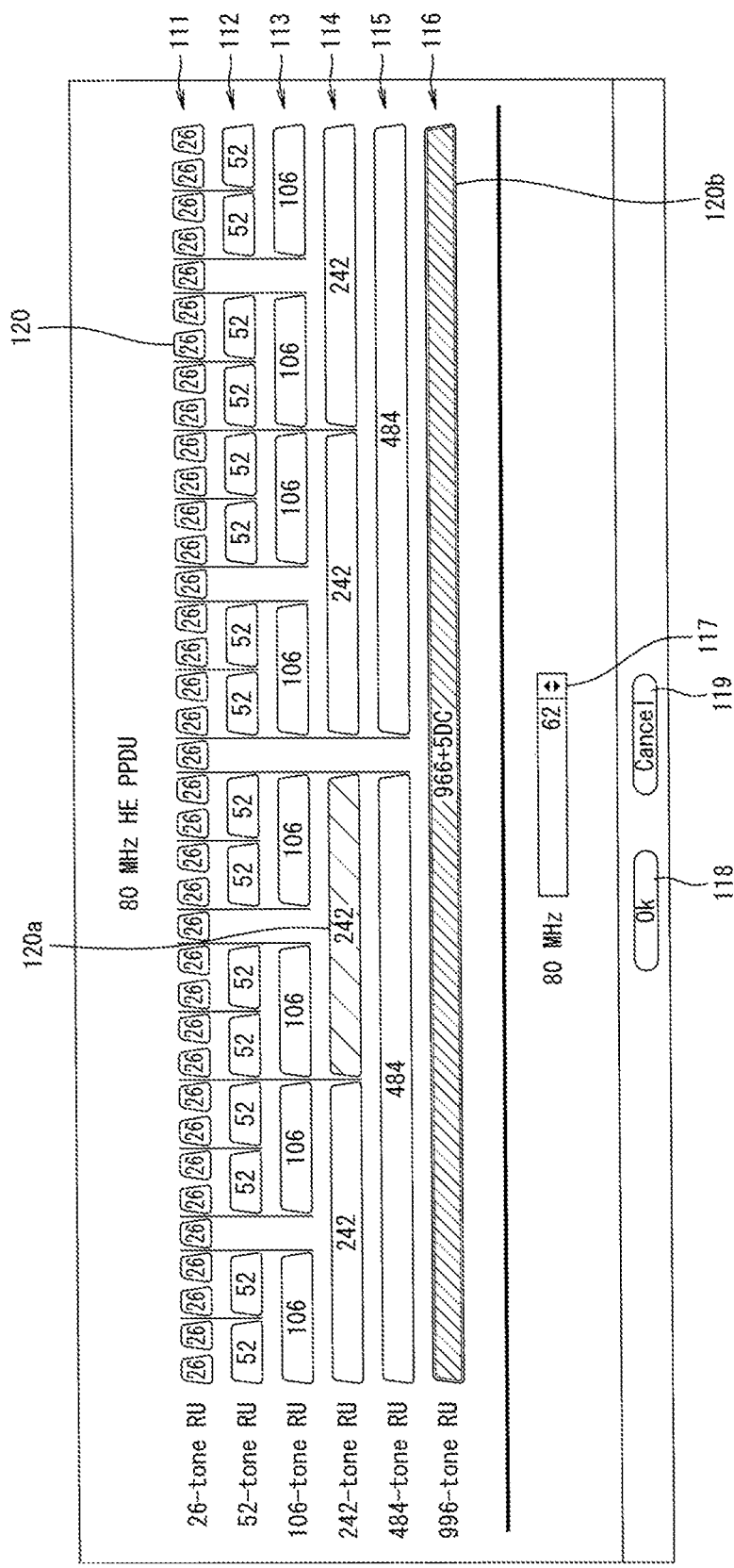
FIG. 3 is a diagram illustrating an example of a resource unit configuration image in a case where a frequency bandwidth of a channel of the measurement apparatus according to the embodiment of the present invention is 80 MHz.

In a case where the frequency bandwidth selected by the PPDU type selection unit 102 is 80 MHz, the control unit 16 displays the image as illustrated in FIG. 3 on the display unit 15 and allocates the RU which is the measurement target. The horizontal direction in FIG. 3 represents a frequency band, and the frequency becomes higher toward the right.

In FIG. 3, a 26-tone display and selection group 111, which are sets continuously arranged in a row direction, is displayed and a resource unit for 26-tone RU is selected. A 52-tone display and selection group 112 is displayed and a resource unit for 52-tone RU is selected. A 106-tone display and selection group 113 is displayed and a resource unit for 106-tone RU is selected. A 242-tone display and selection group 114 is displayed and a resource unit for 242-tone RU is selected. A 484-tone display and selection group 115 is displayed and a resource unit for 484-tone RU is selected. A 996-tone display and selection group 116 is displayed and a resource unit for 996-tone RU is selected.

In each display and selection group, resource unit display graphic forms 120 representing the respective resource units are displayed by the number of resource units. The resource unit display graphic form 120 represents, for example, a frequency bandwidth of each resource unit and a position on the frequency bandwidth of a channel with an approximately trapezoidal graphic form.

The control unit 16 displays the resource unit display graphic form 120 while changing the display between unselected, selected, and before selection (in the middle of selection). The before selection means, for example, that a mouse cursor in an image on the display unit 15 operated by the mouse of the operation unit 14 is in a rollover state of being within a range of the resource unit display graphic form 120 and is in a state of being selected by a click operation being performed by the mouse as it is.

For example, the control unit 16 displays the selected resource unit display graphic form 120 in the same manner as a resource unit display graphic form 120a. For example, the control unit 16 displays the resource unit display graphic form 120 before selection in the same manner as a resource unit display graphic form 120b. The resource unit display graphic form 120a and the resource unit display graphic form 120b are different from each other so that the display forms can be identified.

The RU number display and selection unit 117 displays a number of the selected resource unit and designates the resource unit to be selected by a numerical value.

The control unit 16 displays a number of the selected resource unit display graphic form 120a on the RU number display and selection unit 117. In addition, the control unit displays the resource unit display graphic form 120 corresponding to the numerical value input to the RU number display and selection unit 117 to be selected.

For example, the control unit 16 may display a list of numbers of selectable resource units so that a number of the resource unit is selected, when the mouse of the operation unit 14 performs a click operation within a range of the RU number display and selection unit 117.

The resource units are numbered in the right direction in order, with a resource unit at the left end of the 26-tone display and selection group 111 being zero. The 26-tone display and selection group 111 has zero to 36, the 52-tone display and selection group 112 has 37 to 52, the 106-tone display and selection group 113 has 53 to 60, the 242-tone display and selection unit 114 has 61 to 64, the 484-tone display and selection group 115 has 65 and 66, and the 996-tone display and selection group 116 has 67. In a case where a bandwidth of the channel is 40 MHz, a number of a portion corresponding to 40 MHz from the left end in FIG. 3 is used, and in a case where the bandwidth of the channel is 20 MHz, a number of a portion corresponding to 20 MHz from the left end in FIG. 3 is used.

The RU allocation setting unit 103 in FIG. 2 can designate a resource unit which is a measurement target by a numerical value, in the same manner as the RU number display and selection unit 117.

In FIG. 3, a confirm button 118 is to confirm a setting of the selected resource unit. When the confirm button 118 is selected by an operation of the operation unit 14, the control unit 16 sets a resource unit corresponding to the selected resource unit display graphic form 120a as a resource unit of the measurement target and returns the display of the display unit 15 to the display in FIG. 2 (the display in FIG. 3 disappears). At this time, the control unit 16 causes the RU allocation setting unit 103 to display the number of the selected resource unit.

In FIG. 3, a cancel button 119 is to cancel the setting of the change of the selected resource unit. When the cancel button 119 is selected by an operation of the operation unit 14, the control unit 16 sets the resource unit selected before displaying the image in FIG. 3 as a resource unit of the measurement target and returns the display of the display unit 15 to the display in FIG. 2. At this time, the control unit 16 causes the RU allocation setting unit 103 to display a number of the resource unit before displaying the image in FIG. 3.

Figure 4:
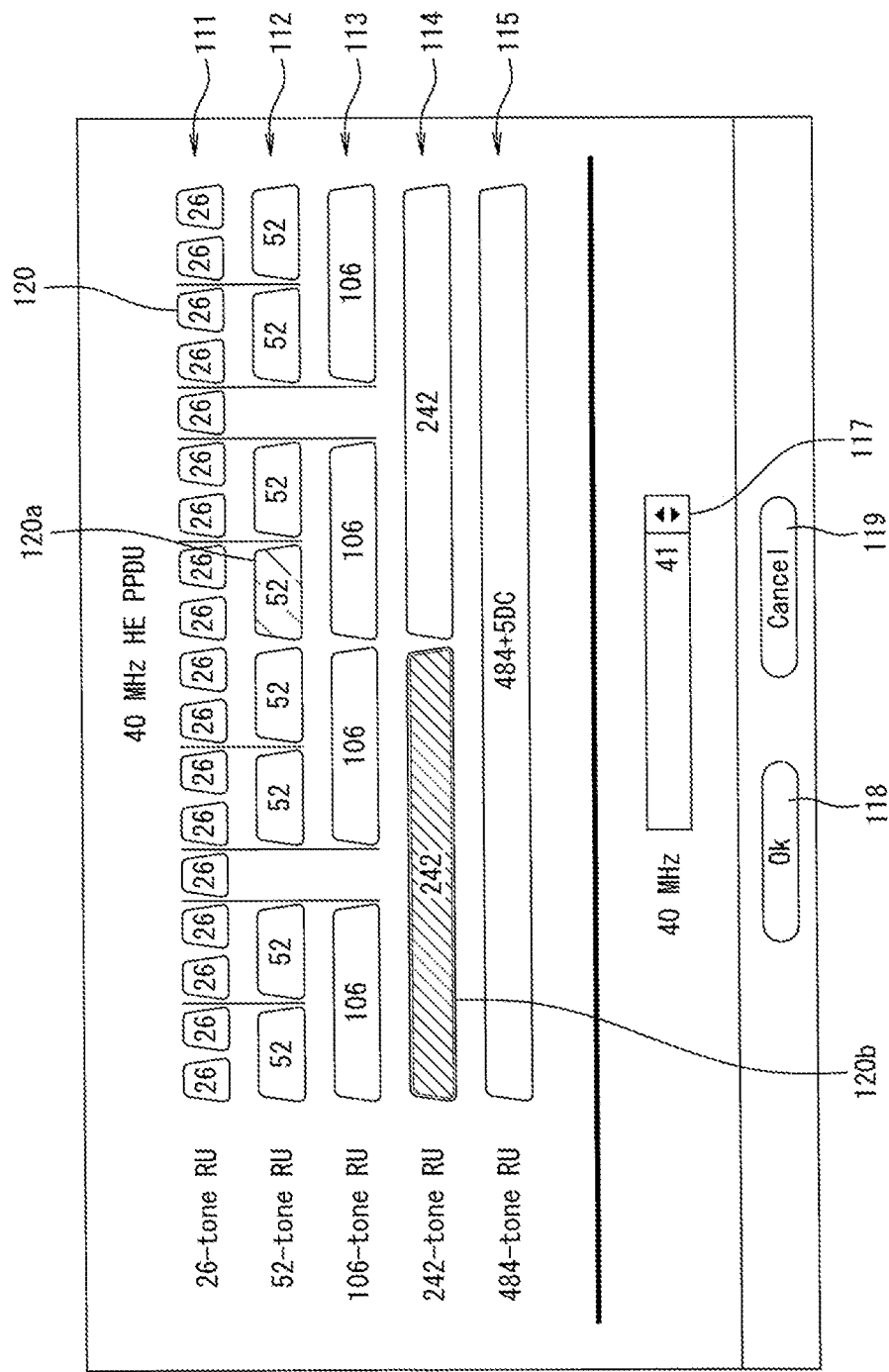
FIG. 4 is a diagram illustrating an example of a resource unit configuration image in a case where the frequency bandwidth of the channel of the measurement apparatus according to the embodiment of the present invention is 40 MHz.

In a case where the frequency bandwidth selected by the PPDU type selection unit 102 is 40 MHz, the control unit 16 displays the image as illustrated in FIG. 4 on the display unit 15 and allocates the RU which is the measurement target.

In FIG. 4, since the frequency bandwidth is 40 MHz, the 996-tone display and selection group 116 is not displayed.

In a case where the frequency bandwidth is 40 MHz, a number of the resource unit is used with a number of a portion corresponding to 40 MHz from the left end in FIG. 3, so that the 26-tone display and selection group 111 has zero to 17, the 52-tone display and selection group 112 has 37 to 44, the 106-tone display and selection group 113 has 53 to 56, the 242-tone display and selection group 114 has 61 and 62, and the 484-tone display and selection group 115 has 65.

Figure 5:
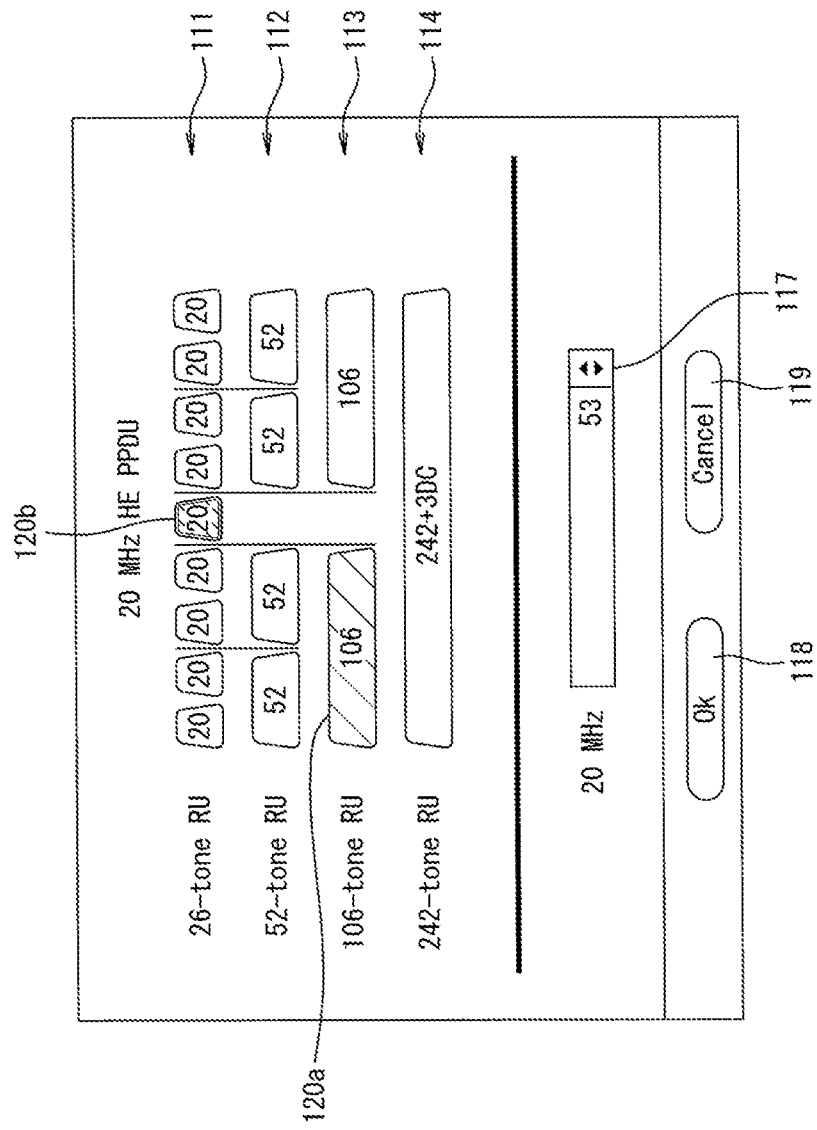
FIG. 5 is a diagram illustrating an example of a resource unit configuration image in a case where the frequency bandwidth of the channel of the measurement apparatus according to the embodiment of the present invention is 20 MHz.

In a case where the frequency bandwidth selected by the PPDU type selection unit 102 is 20 MHz, the control unit 16 displays the image as illustrated in FIG. 5 on the display unit 15 and allocates the RU which is the measurement target.

In FIG. 5, since the frequency bandwidth is 20 MHz, the 484-tone display and selection group 115 and the 996-tone display and selection group 116 are not displayed.

In a case where the frequency bandwidth is 20 MHz, a number of the resource unit is used with a number of a portion corresponding to 20 MHz from the left end in FIG. 3, the 26-tone display and selection group 111 has zero to 8, the 52-tone display and selection group 112 has 37 to 40, the 106-tone display and selection group 113 has 53 and 54, and the 242-tone display and selection group 114 has 61.

The control unit 16 communicates with the device under test (DUT) 100 by using the resource unit set in this manner, and performs various types of measurement. For example, an operator selects a desired resource unit by using the RU configuration image in FIG. 3, and confirms the resource unit to be transmitted to the device under test (DUT) 100. A measurement condition including the selected resource unit is notified to the device under test (DUT) 100 from the transmission unit 10, and the device under test (DUT) 100 transmits back a predetermined signal with the designated resource unit to the measurement apparatus 1. The measurement apparatus 1 causes the reception unit 11 to receive the signal transmitted back, and causes the signal analysis unit 13 to measure a transmission characteristic and the like.

In a case where a plurality of resource units which are measurement targets are selectably set and the plurality of resource units are selected, measurements may be performed, for example, on the plurality of resource units in the selected order, and each measurement result may be stored in the hard disk device or the like. At this time, any one image in FIGS. 3 to 5 may be displayed, the display of the resource unit display graphic form 120 of the selected plurality of resource units may be changed and performed, and the display of the resource unit display graphic form 120 of the resource unit of which measurement is completed may be further changed so that a progress of the measurement can be known.

In this manner, in the above-described embodiment, in a case where communication in accordance with a standard of IEEE 802.11ax is measured, the display unit 15 selectably displays a plurality of resource unit display graphic forms 120 which is a graphic form illustrating resource units arranged in the frequency bandwidth of the channel, at least one resource unit which is a measurement target can be designated by the selection in the resource unit display graphic form 120, and a display of the resource unit display graphic form 120 is varied between an unselected state, a selected state, and a state before selection which are different from each other.

Thus, it is possible to easily confirm a position of the selected resource unit or the resource unit to be selected, and it is possible to easily and definitely designate the desired measurement target.

Further, a number of the selected resource unit is further displayed as the RU number display and selection unit 117.

Thus, the position of the resource unit can be easily confirmed by the number of the selected resource unit, and the desired measurement target can be easily and definitely designated.

In addition, the resource unit display graphic form 120 has a size corresponding to a frequency bandwidth of the corresponding resource unit.

Thus, it is possible to easily confirm the frequency bandwidth of the selected resource unit or the resource unit to be selected, and it is possible to easily and definitely designate the desired measurement target.

Although the embodiment of the present invention is disclosed, it is apparent that the embodiment can be modified by those skilled in the art without departing from the scope of the invention. All such modifications and equivalents are intended to be included in the following claims.

DESCRIPTION OF REFERENCE NUMERALS AND SIGNS

1 measurement apparatus
15 display unit 16 control unit
100 device under test (DUT)
103 RU allocation setting unit
104 RU allocation selection icon
111 26-tone display and selection group
112 52-tone display and selection group
113 106-tone display and selection group
114 242-tone display and selection group
115 484-tone display and selection group
116 996-tone display and selection group
117 RU number display and selection unit
120, 120a, 120b resource unit display graphic form

What is claimed is:

1. A measurement apparatus which transmits and receives a wireless signal to and from a device under test (DUT) and measures a transmission and reception characteristic of the DUT, the apparatus comprising:
a display; and
a processor that is configured to:
select a format of a physical layer convergence protocol (PLCP) protocol data unit (PPDU) and a frequency bandwidth, from one of 20 MHz, 40 MHz, and 80 MHz, for a channel, the selected frequency bandwidth being divided into multiple-level resource units comprising 26-tone resource units (RUs), 52-tone RUs, 106-tone RUs, 242-tone RUs, at least one 484-tone RU, and at least one 996-tone RU, each N-tone RU having N numbers of subcarriers,
selectably display a plurality of resource unit display graphic forms which are graphic forms illustrating resource units arranged in the selected frequency bandwidth of the channel on the display, wherein:
when the selected frequency bandwidth is 20 MHz, the illustrated resource units include a plurality of 26-tone RUs, a plurality of 52-tone RUs, two of the 106-tone RUs, and one of the 242-tone RUs,
when the selected frequency bandwidth is 40 MHz, the illustrated resource units include a plurality of 26-tone RUs, a plurality of 52-tone RUs, a plurality of 106-tone RUs, two of 242-tone RUs, and one of the 484-tone RUs, and
when the selected frequency bandwidth is 80 MHz, the illustrated resource units include of a plurality of 26-tone RUs, a plurality of 52-tone RUs, a plurality of 106-tone RUs, a plurality of 242-tone RUs, two of 484-tone RUs and one of the 996-tone RUs,
select, among the illustrated resource units, a resource unit which is a measurement target by selecting at least one of the plurality of resource unit display graphic forms, and
vary a display of the resource unit display graphic form between an unselected state, a selected state, and a state before selection which are different from each other,
wherein the measurement of the transmission and reception characteristic of the DUT is in accordance with a wireless local area network standard.

2. The measurement apparatus according to claim 1, wherein the processor is further configured to display a number of the selected resource unit as an RU number display and selection unit.

3. The measurement apparatus according to claim 1, wherein the processor is further configured to display an RU number display and selection unit capable of selecting a desired resource unit by inputting a number of the desired resource unit, and set a display of the resource unit display graphic form selected by the RU number display and selection unit as being selected.

4. The measurement apparatus according to claim 3, wherein the processor is configured to display the resource unit display graphic form in a size corresponding to a frequency bandwidth of a corresponding resource unit, and display a plurality of the resource unit display graphic forms having the same size side by side in a horizontal direction representing a frequency band for each respective N-tone RU.

5. The measurement apparatus according to claim 1, wherein the processor is configured to display the resource unit display graphic form in a size corresponding to a frequency bandwidth of a corresponding resource unit, and display a plurality of the resource unit display graphic forms having the same size side by side in a horizontal direction representing a frequency band for each respective N-tone RU.

6. The measurement apparatus according to claim 2, wherein the processor is configured to display the resource unit display graphic form in a size corresponding to a frequency bandwidth of a corresponding resource unit, and display a plurality of the resource unit display graphic forms having the same size side by side in a horizontal direction representing a frequency band for each respective N-tone RU.

7. The measurement apparatus according to claim 1, wherein each resource unit display graphic form indicates a respective number indicating how many subcarriers are in a respective resource unit.

8. The measurement apparatus according to claim 1, wherein the resource unit display graphic forms are displayed as a list.

9. The measurement apparatus according to claim 1, wherein a plurality of resource units are selected in an order as the measurement targets in the selected order, and the processor is configured to vary the display of the selected resource unit display graphic forms to indicate a progress of the measurement through the selected order.

10. A measurement target display method of a measurement apparatus which includes a display and measures a transmission and reception characteristic of a device under test (DUT) by transmitting and receiving a wireless signal to and from the DUT, the method comprising:
a step of selecting a format of a physical layer convergence protocol (PLCP) protocol data unit (PPDU) and frequency bandwidth, from one of 20 MHz, 40 MHz, and 80 MHz, for a channel, the selected frequency bandwidth being divided into multiple-level resource units comprising 26-tone resource units (RUs), 52-tone RUs, 106-tone RUs, 242-tone RUs, a 484-tone RU, and a 996-tone RU, each N-tone RU resource unit having N numbers of subcarriers,
a step of selectably displaying a plurality of resource unit display graphic forms which are graphic forms illustrating the resource units arranged in the selected frequency bandwidth of the channel, on the display wherein:
when the selected frequency bandwidth is 20 MHz, the illustrated resource units include a plurality of 26-tone RUs, a plurality of 52-tone RUs, two of 106-tone RUs, and one of the 242-tone RUs,
when the selected frequency bandwidth is 40 MHz, the illustrated resource units include a plurality of 26-tone RUs, a plurality of 52-tone RUs, a plurality of 106-tone RUs, two of 242-tone RUs, and one of the 484-tone RUs, and when the selected frequency bandwidth is 80 MHz, the illustrated resource units include of a plurality of 26-tone RUs, a plurality of 52-tone RUs, a plurality of 106-tone RUs, a plurality of 242-tone RUs, two of 484-tone RUs and one of the 996-tone RUs;

a step of selecting, among the illustrated resource units, a resource unit which is a measurement target by selecting at least one of the plurality of resource unit display graphic forms; and a step of varying a display of the resource unit display graphic form between an unselected state, a selected state, and a state before selection which are different from each other, wherein the measurement of the transmission and reception characteristic of the DUT is in accordance with a wireless local area network standard.

11. The measurement target display method according to claim 10, wherein each resource unit display graphic form indicates a respective number indicating how many subcarriers are in a respective resource unit.

12. The measurement target display method according to claim 10, wherein the resource unit display graphic forms are displayed as a list.

13. The measurement target display method according to claim 10, wherein a plurality of resource units are selected in an order as the measurement targets in the selected order, and the step of varying the display of the selected resource unit display graphic forms includes indicating a progress of the measurement through the selected order.

14. A measurement target display method of a measurement apparatus which includes a display and measures a transmission and reception characteristic of a device under test (DUT) by transmitting and receiving a wireless signal to and from the DUT, the method comprising:

a step of selecting a format of a physical layer convergence protocol (PLCP) protocol data unit (PPDU) and a frequency bandwidth, from one of 20 MHz, 40 MHz, and 80 MHz, for a channel, the selected frequency bandwidth being divided into multiple-level resource units comprising 26-tone resource units (RUs), 52-tone RUs, 106-tone RUs, 242-tone RUs, a 484-tone RU, and a 996-tone RU, each N-tone RU having N numbers of subcarriers;

a step of selectably displaying a plurality of resource unit display graphic forms which are graphic forms illustrating the resource units arranged in the selected frequency bandwidth of the channel, on the display, wherein:

when the selected frequency bandwidth is 20 MHz, the illustrated resource units include a plurality of 26-tone RUs, a plurality of 52-tone RUs, two of 106-tone RUs, and one of the 242-tone RUs, when the selected frequency bandwidth is 40 MHz, the illustrated resource units include a plurality of 26-tone RUs, a plurality of 52-tone RUs, a plurality of 106-tone RUs, two of 242-tone RUs, and one of the 484-tone RUs, and when the selected frequency bandwidth is 80 MHz, the illustrated resource units include of a plurality of 26-tone RUs, a plurality of 52-tone RUs, a plurality of 106-tone RUs, a plurality of 242-tone RUs, two of 484-tone RUs and one of the 996-tone RUs;

a step of selecting at least one of the plurality of resource unit display graphic forms by inputting a number of the resource unit to select a resource unit which is a measurement target; and a step of varying a display of the resource unit display graphic form between an unselected state, a selected state, and a state before selection which are different from each other, wherein the measurement of the transmission and reception characteristic of the DUT is in accordance with a wireless local area network standard.

15. The measurement target display method according to claim 14, wherein each resource unit display graphic form indicates a respective number indicating how many subcarriers are in a respective resource unit.

16. The measurement target display method according to claim 14, wherein the resource unit display graphic forms are displayed as a list.

17. The measurement target display method according to claim 14, wherein a plurality of resource units are selected in an order as the measurement targets in the selected order, and the step of varying the display of the selected resource unit display graphic forms includes indicating a progress of the measurement through the selected order.

\* \* \* \* \*